(12) United States Patent
Ng

(10) Patent No.: US 9,909,389 B2
(45) Date of Patent: Mar. 6, 2018

(54) DUAL TORSION SPRINGS FLAPPER VALVE CLOSURE MECHANISM

(71) Applicant: Halliburton Energy Services, Inc., Houston, TX (US)

(72) Inventor: Shaun Wen Jie Ng, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/110,539

(22) PCT Filed: Sep. 15, 2015

(86) PCT No.: PCT/US2015/050197
§ 371 (c)(1),
(2) Date: Jul. 8, 2016

(87) PCT Pub. No.: WO2017/048236
PCT Pub. Date: Mar. 23, 2017

(65) Prior Publication Data
US 2017/0226823 A1    Aug. 10, 2017

(51) Int. Cl.
*E21B 34/10* (2006.01)
*F16K 1/20* (2006.01)
*F16K 31/56* (2006.01)
*E21B 34/00* (2006.01)

(52) U.S. Cl.
CPC .............. *E21B 34/10* (2013.01); *F16K 1/205* (2013.01); *F16K 31/563* (2013.01); *E21B 2034/005* (2013.01)

(58) Field of Classification Search
CPC .. E21B 34/12; E21B 2034/005; F16K 31/563; F16K 1/205
See application file for complete search history.

(56) References Cited

U.S. PATENT DOCUMENTS

| 2006/0011354 | A1 | 1/2006 | Logiudice et al. |
| 2008/0257548 | A1 | 10/2008 | Shaw et al. |
| 2011/0088907 | A1 | 4/2011 | Xu |
| 2014/0124212 | A1 | 5/2014 | Slup |

FOREIGN PATENT DOCUMENTS

WO    2013089746 A1    6/2013

OTHER PUBLICATIONS

International Search Report and Written Opinion received in PCT Application No. PCT/US2015/050197, dated May 12, 2016.

*Primary Examiner* — Brad Harcourt
(74) *Attorney, Agent, or Firm* — McDermott Will & Emery LLP

(57) ABSTRACT

A flapper valve includes a body having first and second end, and a flapper pivotably coupled to the body and movable between a closed position, where the flapper prevents fluid flow through the body, and an open position, where fluid flow is allowed through the body. A first torsion spring is coupled to the body at the second end and provides a spring arm that engages and urges the flapper to the closed position. A support beam is coupled to the body and includes an axial extension that extends axially past the second end. A closure beam having a first beam end is pivotably coupled to the axial extension and a second beam end is engageable with the flapper. A second torsion spring is coupled to the axial extension and engageable with the closure beam to urge the closure beam into engagement with the flapper.

18 Claims, 4 Drawing Sheets

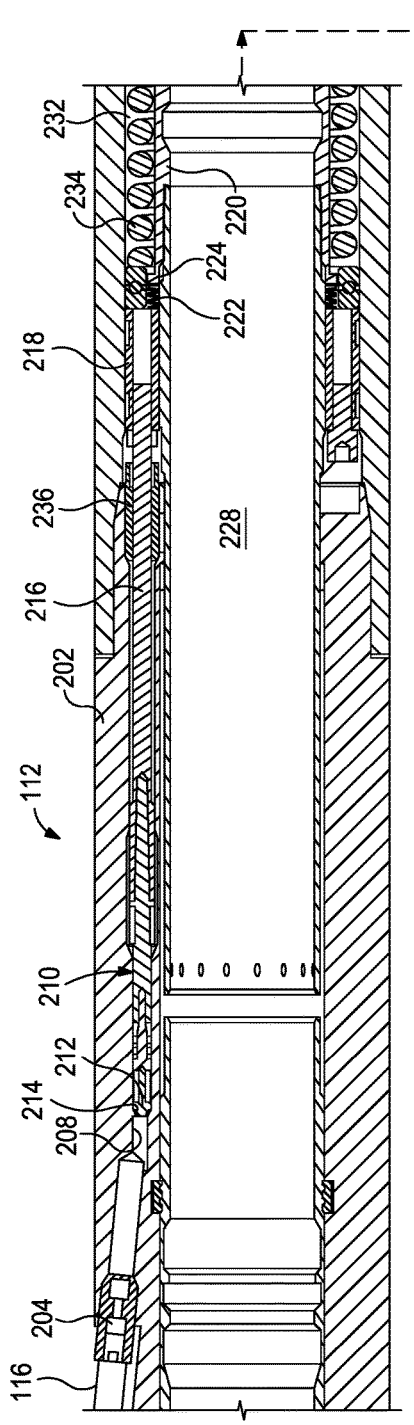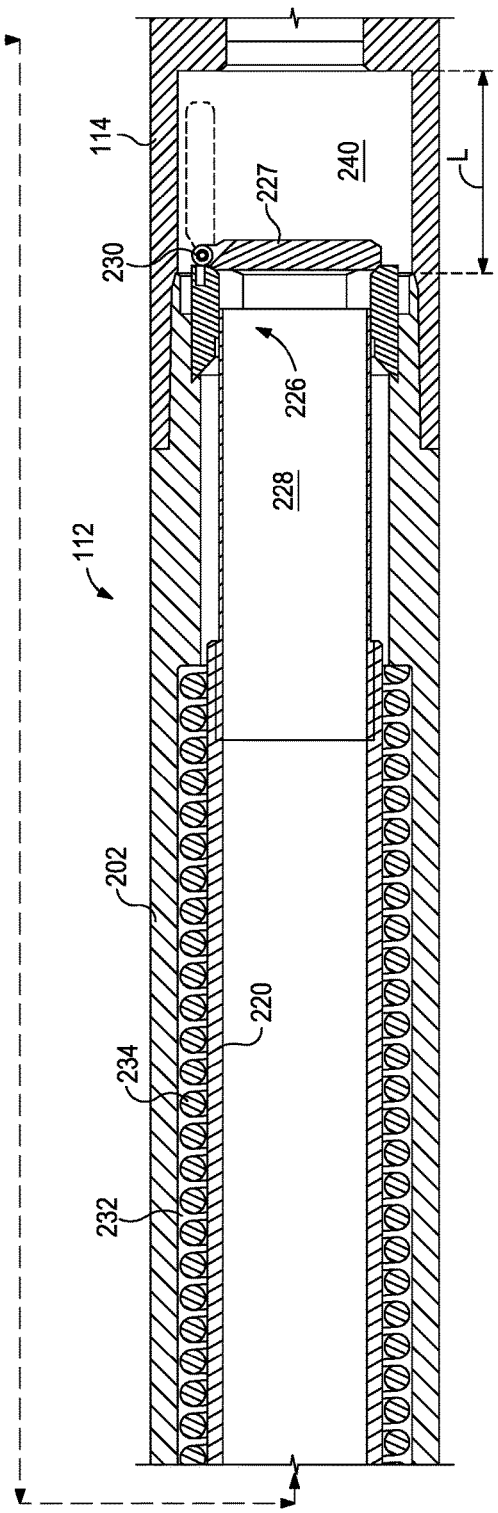

DUAL TORSION SPRINGS FLAPPER VALVE CLOSURE MECHANISM

BACKGROUND

Subsurface safety valves are well known in the oil and gas industry and act as a failsafe to prevent the uncontrolled release of subterranean reservoir fluids in the event of a worst-case scenario surface disaster. Typical subsurface safety valves comprise flapper-type valves that are opened and closed with the help of a flow tube moving telescopically within a production tubular or tubing string. The flow tube is often controlled hydraulically from the well surface and is forced into its open position using a piston and rod assembly that may be hydraulically charged via a control line linked directly to a hydraulic manifold or pressure control system at the well surface. When sufficient hydraulic pressure is conveyed to the subsurface safety valve via the control line, the piston and rod assembly urges the flow tube downwards, which compresses a spring and simultaneously pushes the flapper to its open position. When the hydraulic pressure is removed from the control line, either manually or in the event of a surface disaster, the spring pushes the flow tube back upwards and out of engagement with the flapper, which allows a torsion spring to move the flapper back to its closed position.

As the setting depths of hydraulically-actuated subsurface safety valves continue to increase, the robustness or thickness of associated flappers also increases to accommodate elevated downhole pressures and temperatures. Thicker flappers, however, are more difficult to fully close using conventional torsion springs, and, if a flapper fails to fully close, potentially hazardous reservoir fluids may escape into the surrounding environment via the partially closed tubing string.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

FIGS. 2A and 2B illustrate progressive cross-sectional side views of an exemplary safety valve.

DETAILED DESCRIPTION

The present invention relates generally to operations performed and equipment utilized in conjunction with a subterranean well and, in particular, to a flapper valve closure mechanism that uses dual torsion springs to fully close a flapper valve.

Embodiments discussed herein describe a flapper valve closure mechanism that employs dual torsion springs that cooperatively help close a flapper valve. Each torsion spring act on the flapper to move it to the closed position, thereby allowing an operator to employ thicker or more robust flappers. The additional torsion spring enhances the shutting force of the flapper valve and thereby improves its sealing integrity. One described flapper valve includes a body and a flapper pivotably coupled to the body at a second end. The flapper may be movable between a closed position, where the flapper prevents fluid flow through the body, and an open position, where fluid flow is allowed through the body. A first torsion spring may be coupled to the body at the second end and provides a spring arm that engages and urges the flapper to the closed position. A support beam may be coupled to the body and includes an axial extension that extends axially past the second end. A closure beam may be included and may have a first beam end pivotably coupled to the axial extension and a second beam end engageable with the flapper. A second torsion spring may be coupled to the axial extension and engageable with the closure beam to urge the closure beam into engagement with the flapper.

Figure 1:
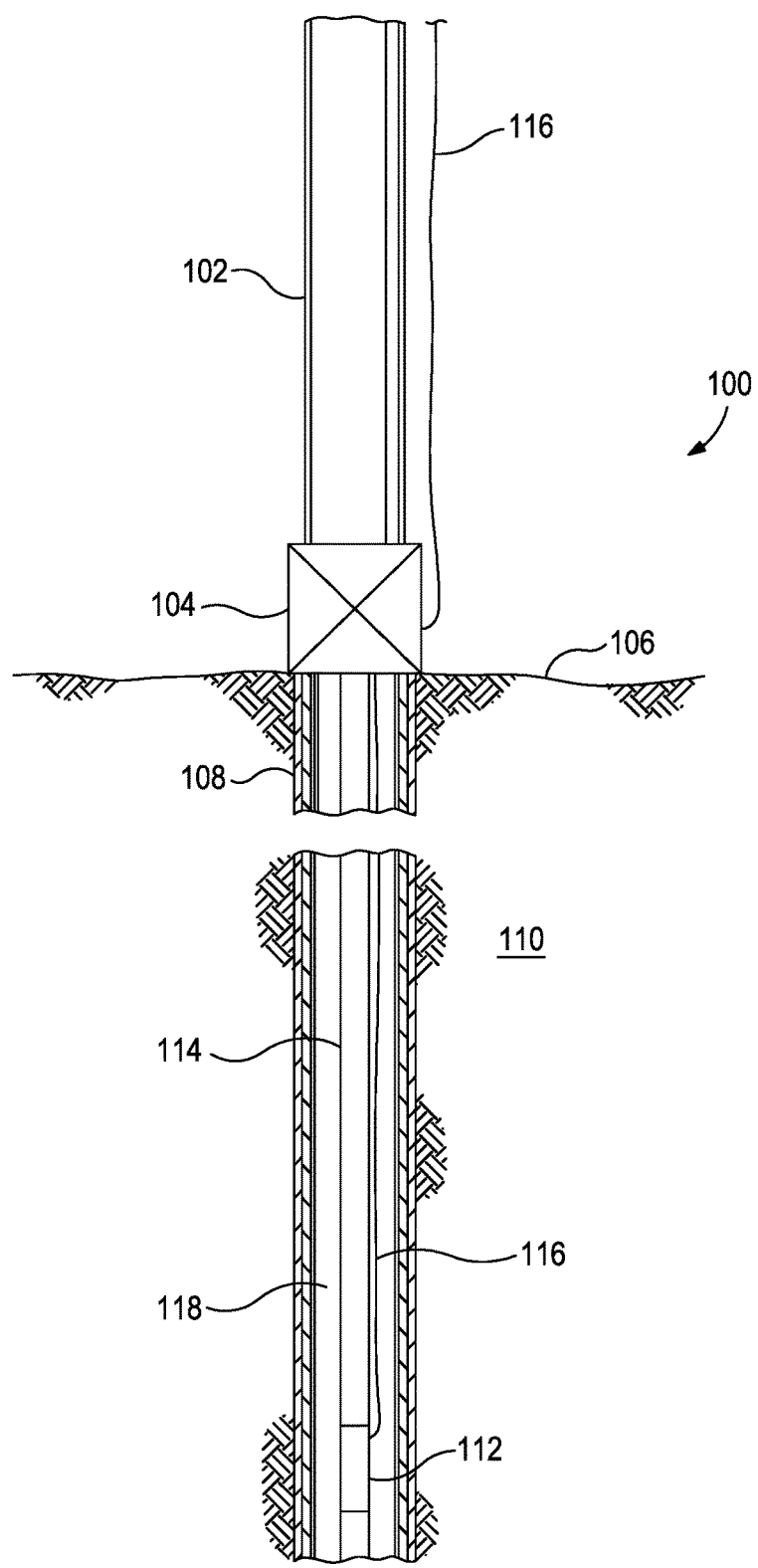
FIG. 1 illustrates a well system that can incorporate the principles of the present disclosure.

FIG. 1 is a well system 100 that can incorporate one or more principles of the present disclosure, according to one or more embodiments. As illustrated, the well system 100 may include a riser 102 extending from a wellhead installation 104 arranged at a sea floor 106. The riser 102 may extend, for example, to an offshore oil and gas platform (not shown). A wellbore 108 extends downward from the wellhead installation 104 through various subterranean formations 110. The wellbore 108 is depicted as being cased, but it could equally be an uncased wellbore 108, without departing from the scope of the disclosure. Although FIG. 1 depicts the well system 100 in the context of an offshore oil and gas application, it will be appreciated by those skilled in the art that the various embodiments disclosed herein are equally well suited for use in land-based applications located at any geographical site. Thus, it should be understood that the disclosure is not limited to any particular type of well.

The well system 100 may further include a subsurface safety valve 112 (hereafter "safety valve 112") interconnected with a tubing string 114 that can be introduced into the wellbore 108 and extend from the wellhead installation 104. The tubing string 114, which may comprise production tubing or the like, may be configured to communicate fluids (e.g., hydrocarbons) extracted from the subterranean formations 110 and drawn into the wellbore 108 to the well surface via the wellhead installation 104. A control line 116 may extend from the well surface and into the wellhead installation 104, which, in turn, conveys the control line 116 into an annulus 118 defined between the wellbore 108 and the tubing string 114.

In some cases, as illustrated, the control line 116 may extend within the annulus 118 to eventually communicate with the safety valve 112. In other cases, however, the control line 116 could alternatively be arranged internal to the tubing string 114, or otherwise formed in a sidewall of the tubing string 114. The control line 116 may extend from a remote location, such as from the earth's surface, or another location in the wellbore 108. In yet other embodiments, the control line 116 may extend from a pressure control system located downhole.

The control line 116 may be configured to actuate the safety valve 112, for example, to maintain the safety valve 112 in an open position, or otherwise to close the safety valve 112 and thereby cease production or prevent a blowout in the event of an emergency. More particularly, the control line 116 may be a hydraulic conduit that provides hydraulic fluid pressure to the safety valve 112. In operation, hydraulic fluid is applied to the control line 116 from a hydraulic pressure control system arranged at a remote location, such as at a production platform, a subsea control station, or a pressure control system located downhole. When properly applied, the hydraulic pressure may open and maintain the safety valve 112 in its open position, thereby allowing production fluids to flow through the safety valve 112, through the tubing string 114, and uphole to a surface location. To close the safety valve 112, the hydraulic pressure in the control line 116 is reduced or entirely eliminated.

The use of directional terms such as above, below, upper, lower, upward, downward, left, right, uphole, downhole and the like are used in relation to the illustrative embodiments as they are depicted in the figures, the upward direction being toward the top of the corresponding figure and the downward direction being toward the bottom of the corresponding figure, the uphole direction being toward the surface of the well and the downhole direction being toward the toe of the well.

Referring now to FIGS. 2A and 2B, with continued reference to FIG. 1, illustrated are progressive cross-sectional side views of an exemplary embodiment of the safety valve 112, according to one or more embodiments. In particular, the safety valve 112 is depicted in FIGS. 2A and 2B in successive sectional views, where FIG. 2A depicts an upper portion of the safety valve 112 and FIG. 2B depicts a successive lower portion of the safety valve 112. As illustrated, the safety valve 112 may include a housing 202 that is able to be coupled to the tubing string 114 at opposing ends of the housing 202 (tubing string 114 shown only in FIG. 2B).

A control line port 204 may be provided in the housing 202 for connecting the control line 116 to the safety valve 112. When appropriately connected to the control line port 204, the control line 116 is placed in fluid communication with a piston bore 208 defined in the housing 202 and able to convey hydraulic fluid pressure thereto. The piston bore 208 may be an elongate channel or conduit that extends longitudinally along a portion of the axial length of the safety valve 112.

A piston assembly 210 is arranged within the piston bore 208 and configured to translate axially therein. The piston assembly 210 includes a piston head 212 that mates with and otherwise biases an up stop 214 defined within the piston bore 208 when the piston assembly 210 is forced upwards in the direction of the control line port 204. The up stop 214 may be a radial shoulder defined by the housing 202 within the piston bore 208 and having a reduced diameter and an axial surface configured to engage a corresponding axial surface of the piston head 212. In other embodiments, the up stop 214 may be any device or means arranged within the piston bore 208 that is configured to stop the axial movement of the piston assembly 210 as it advances toward the control line port 204.

The piston assembly 210 may also include a piston rod 216 that extends longitudinally from the piston assembly 210 through at least a portion of the piston bore 208. At a distal end thereof, the piston rod 216 may be coupled to an actuator sleeve 218, which may effectively couple the piston assembly 210 to a flow tube 220 that is movably arranged within the safety valve 112. More particularly, the actuator sleeve 218 may engage a biasing device 222 (e.g., a compression spring, a series of Belleville washers, or the like) arranged axially between the actuator sleeve 218 and an actuation flange 224 that forms part of the proximal end of the flow tube 220. As the actuator sleeve 218 acts on the biasing device 222 with axial force, the actuation flange 224 and the flow tube 220 correspondingly move axially.

The safety valve 112 further includes a flapper valve 226 and associated flapper 227 that is selectively movable between open and closed positions to either prevent or allow fluid flow through a flow passage 228 defined through the interior of the safety valve 112. The flapper valve 226 is shown in FIG. 2B in its closed position whereby the flapper 227 is able to substantially block fluid flow into and through the flow passage 228 from downhole (i.e. to the right in FIG. 2B). At least one torsion spring 230 biases the flapper 227 to pivot to its closed position. As described in more detail below, the flapper valve 226 may include two torsion springs (i.e., dual torsion springs) that are used to cooperatively move the flapper 227 to the closed position.

The flow tube 220 is able to displace downward (i.e., to the right in FIG. 2B) to engage the flapper 227 and overcome the spring force of the torsion spring 230. When the flow tube 220 is extended to its downward position, it engages and moves the flapper 227 from its closed position to an open position (shown in phantom as dashed lines). When the flow tube 220 is displaced back upward (i.e., to the left in FIG. 2B), the torsion spring 230 is able to pivot the flapper 227 back to its closed position. Axial movement of the piston assembly 210 within the piston bore 208 will force the flow tube 220 to correspondingly move axially within the flow passage 228, and either open the flapper 227 or allow it to close, depending on its relative position.

The safety valve 112 may further define a lower chamber 232 within the housing 202. In some embodiments, the lower chamber 232 may form part of the piston bore 208, such as being an elongate extension thereof. A power spring 234, such as a coil or compression spring, may be arranged within the lower chamber 232. The power spring 234 biases the actuation flange 224 and actuation sleeve 218 upwardly which, in turn, biases the piston assembly 210 in the same direction. Accordingly, expansion of the power spring 234 will cause the piston assembly 210 to move upwardly within the piston bore 208.

It should be noted that while the power spring 234 is depicted as a coiled compression spring, any type of biasing device may be used instead of, or in addition to, the power spring 234, without departing from the scope of the disclosure. For example, a compressed gas, such as nitrogen, with appropriate seals may be used in place of the power spring 234. In other embodiments, the compressed gas may be contained in a separate chamber and tapped when needed.

Exemplary operation of the safety valve 112 to selectively open and close the flapper 227 is now provided. Hydraulic pressure may be conveyed to the control line port 204 via the control line 116. As hydraulic pressure is provided to the piston bore 208, the piston assembly 210 is forced to move axially downward within the piston bore 208 and the piston rod 216 mechanically transfers the hydraulic force to the actuation sleeve 218 and the actuation flange 224, thereby correspondingly displacing the flow tube 220 in the downward direction. In other words, as the piston assembly 210 moves axially within the piston bore 208, the flow tube correspondingly moves in the same direction. As the flow tube 220 moves downward, it engages the flapper 227, overcomes the spring force of the torsion spring 230, and thereby pivots the flapper 227 to its open position to permit fluids to enter the flow passage 228 from downhole.

As the piston assembly 210 moves axially downward within the piston bore 208, the power spring 234 is compressed within the lower chamber 232 and progressively builds spring force. In at least one embodiment, the piston assembly 210 will continue its axial movement in the downward direction, and thereby continue to compress the power spring 234, until engaging a down stop 236 (FIG. 2A) arranged within the piston bore 208. A metal-to-metal seal may be created between the piston assembly 210 and the down stop 236 such that the migration of fluids (e.g., hydraulic fluids, production fluids, etc.) therethrough is generally prevented.

When it is desired to close the flapper 227, the hydraulic pressure provided via the control line 116 may be reduced or eliminated, thereby allowing the spring force built up in the power spring 234 to release and displace the piston assembly 210 upwards within the piston bore 208, and thereby correspondingly moving the flow tube 220 in the same direction. As the flow tube 220 moves axially upwards, it will eventually move out of engagement with the flapper 227, thereby allowing the spring force of the torsion spring 230 to pivot the flapper 227 back into its closed position.

The piston assembly 210 will continue its axial movement in the upward direction until the piston head 212 of the piston assembly 210 engages the up stop 214 and effectively prevents the piston assembly 210 from further upward movement. Engagement between the piston head 212 and the up stop 214 may generate a mechanical metal-to-metal seal between the two components to prevent the migration of fluids (e.g., hydraulic fluids, production fluids, etc.) therethrough.

Flapper valves and associated flappers employed in extended depth wells are often required to be much thicker and robust to withstand elevated pressures and temperatures, as compared to flapper valves used at intermediate depths. Conventional torsion springs may not be strong enough to fully shut such thicker and more robust flapper valves. According to embodiments of the present disclosure, a flapper valve closure mechanism is disclosed that employs two torsion springs that cooperatively help close a flapper valve. Using two torsion springs that act on the flapper valve may prove advantageous in allowing an operator to employ thicker or more robust flappers that are optimally designed without having much material removed from its outer surface. As such, operational performance of the flapper valve is not compromised in accordance with the presently described embodiments. Rather, the additional torsion spring enhances the shutting force of the flapper valve and thereby improves its sealing integrity.

Figure 3A:
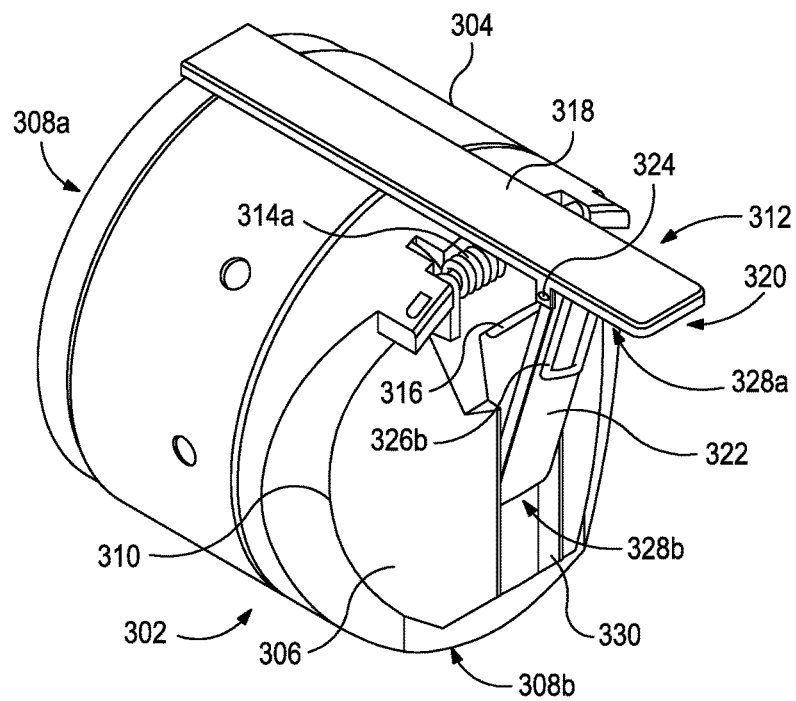
FIGS. 3A and 3B depict isometric views of an exemplary flapper valve.
Figure 3B:
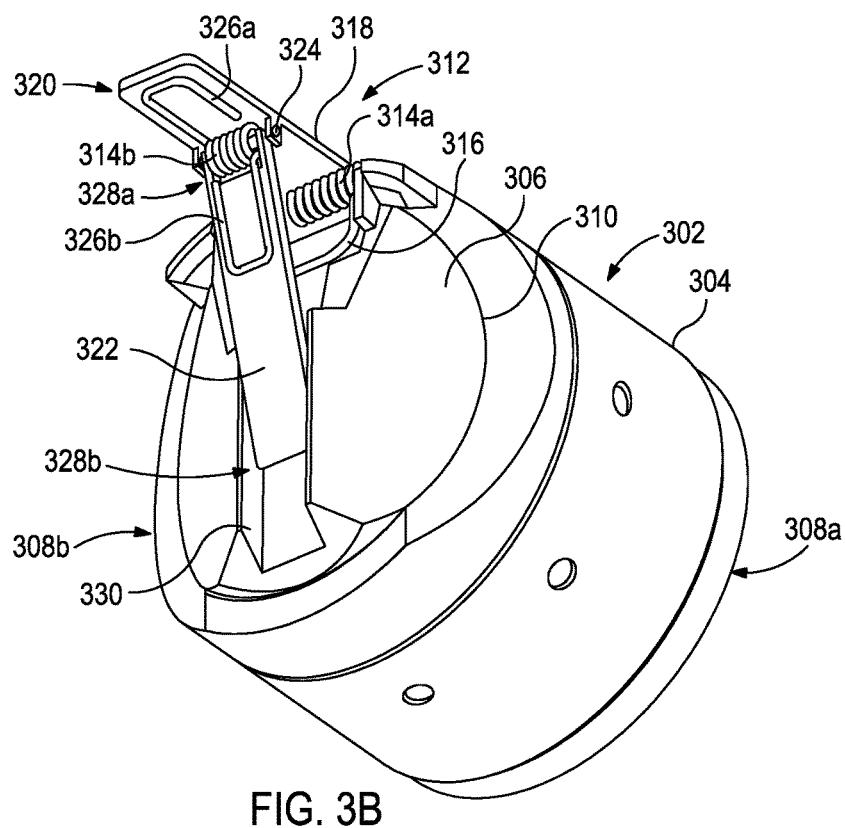

FIGS. 3A and 3B depict isometric views of an exemplary flapper valve 302, according to one or more embodiments. The flapper valve 302 may be the same as or similar to the flapper valve 226 of FIG. 2B and, therefore, in at least one embodiment, may form part of the safety valve 112 of FIGS. 2A-2B. As illustrated, the flapper valve 302 may include a generally cylindrical body 304 and a flapper 306 pivotably coupled to the body 304. The body 304 may have a first end 308a and a second end 308b opposite the first end 308a. At the first end 308a, the body 304 may be configured to be coupled to the housing 202 (FIGS. 2A-2B) of the safety valve 112 (FIGS. 2A-2B) and thereby form an axial extension or integral part of the safety valve 112. At the second end 308b, the body 304 may define an opening or valve seat 310 configured to receive the flapper 306 upon moving the flapper 306 to its closed position, as shown in FIGS. 3A-3B.

The flapper valve 302 may further include a closure mechanism 312 used to move the flapper 306 from an open position, where fluid flow through the flapper valve 302 is allowed, to its closed position, where the flapper 306 is received at the valve seat 310 and thereby prevents fluid flow through the flapper valve 302. As illustrated, the closure mechanism 312 may include a first torsion spring 314a pivotably mounted to the body 304 at the second end 308b. The first torsion spring 314a may have a spring arm 316 or another type of extension that extends to engage the flapper 306.

The first torsion spring 314a may be configured to continuously urge and otherwise bias the flapper 306 toward the valve seat 310 to place the flapper valve 302 in the closed position. More particularly, the spring force of the first torsion spring 314a may be transferred to the spring arm 316, which acts on the back surface of the flapper 306 and thereby urges the flapper 306 toward the closed position. The first torsion spring 314a may be the same as or similar to the torsion spring 230 shown in FIG. 2B. Accordingly, in at least one embodiment, the first torsion spring 314a may comprise a conventional torsion spring used to close a conventional flapper.

The closure mechanism 312 may also include a support beam 318 rigidly mounted and otherwise coupled to the body 304 of the flapper valve 302. The support beam 318 may include an axial extension 320 that extends axially past the second end 308b of the body 304. The support beam 318 may be secured to the body 304 via a variety of means including, but not limited to, welding, brazing, an adhesive, one or more mechanical fasteners (e.g., screws, bolts, pins, snap rings, clasps, etc.), or any combination thereof. In at least one embodiment, the support beam 318 may comprise an integral or monolithic extension of the body 304 and may otherwise be formed simultaneously with the body 304.

The closure mechanism 312 may further include a second torsion spring 314b (best seen in FIG. 3B) and a closure beam 322. The second torsion spring 314b and the closure beam 322 may each be pivotably coupled to the support beam 318 at a pivot point 324 provided on the axial extension 320. As illustrated, the pivot point 324 may be located at a point between the second end 308b of the body 304 and the distal end of the axial extension 320. The axial extension 320 may provide a rigid support for the second torsion spring 314b and the closure beam 322.

The second torsion spring 314b may include a first arm 326a and an opposing second arm 326b. As mounted to the support beam 318, the first arm 326a may engage and otherwise bias against the underside of the axial extension 320, and the second arm 326b may engage and otherwise bias against a surface of the closure beam 322. The spring force exhibited by the second torsion spring 314b via the first and second arms 326a,b continuously urges the closure beam 322 away from the underside of the axial extension 320 and otherwise into engagement with the backside of the flapper 306.

In some embodiments, as illustrated, the support beam 318 and the closure beam 322 may each comprise rectangular plate-like structures. In other embodiments, however, one or both of the support beam 318 and the closure beam 322 may exhibit other shapes or configurations, without departing from the scope of the disclosure. In at least one embodiment, for instance, the support beam 318 may exhibit an arcuate cross-section that generally conforms with the curvature of the body 304. The support beam 318 and the closure beam 322 may each be made from a metal (e.g., steel, stainless steel, etc.) or another hard material, such as a hard plastic or a composite, or any other material that is compatible with a High Pressure/High Temperature downhole environment).

The closure beam 322 may have a first beam end 328a and a second beam end 328b opposite the first beam end 328a. As illustrated, the first beam end 328a may be pivotably coupled to the support beam 318 (i.e., the axial extension 320) at the pivot point 324, and the second beam end 328b may engage the backside of the flapper 306. More particularly, the second beam end 328b may be configured to engage and slide within a groove 330 defined in the backside of the flapper 306. As discussed below, the second arm 326b of the second torsion spring 314b may act on the closure beam 322 such that the closure beam 322 serves as a fulcrum arm with mechanical advantage that provides force against the flapper 306 that may be used to supplement the closing force provided by the first torsion spring 314a.

Figure 4A:
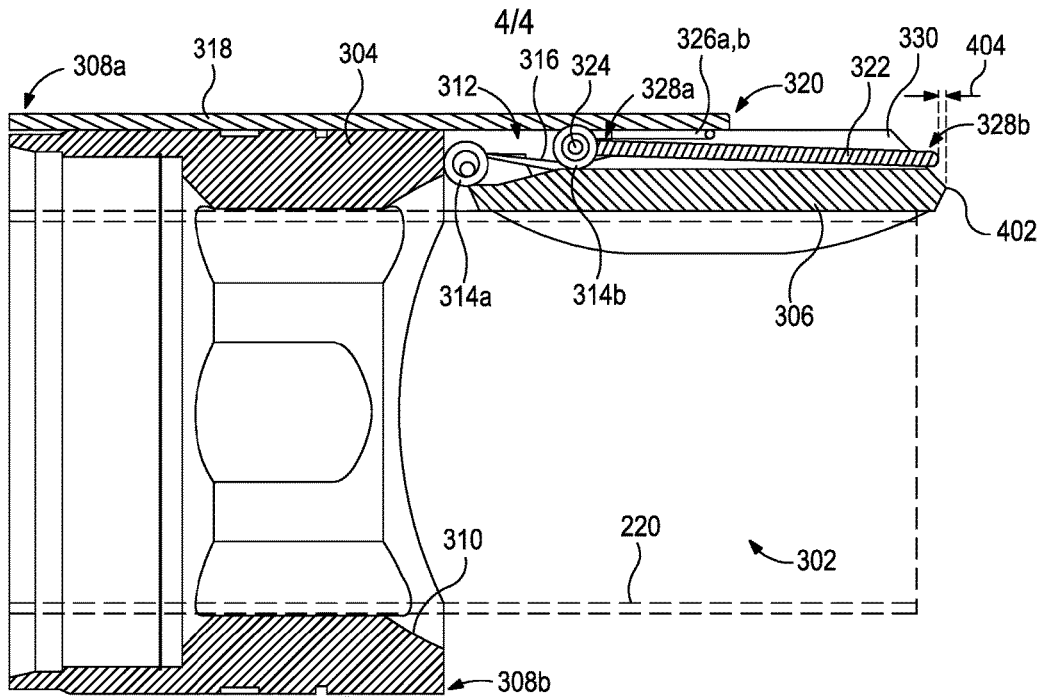
FIGS. 4A and 4B are cross-sectional side views of the flapper valve of FIGS. 3A-3B.
Figure 4B:
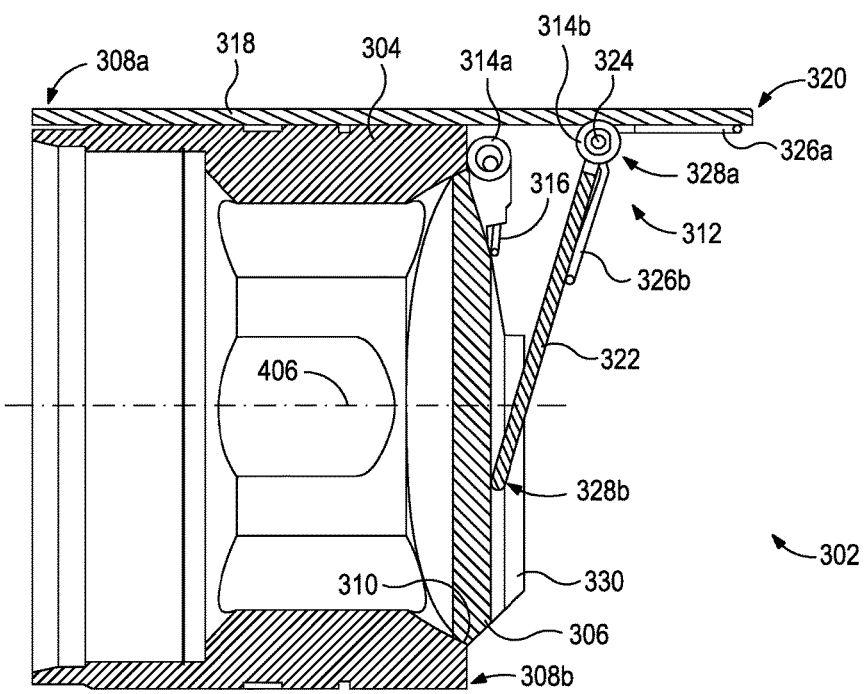

FIGS. 4A and 4B are cross-sectional side views of the flapper valve 302, according to one or more embodiments. The flapper valve 302 is depicted in FIG. 4A in the open position, and depicted in FIG. 4B in the closed position. Similar reference numerals from FIGS. 3A-3B that are used in FIGS. 4A-4B represent like components or elements and, therefore, may not be described again.

In FIG. 4A, the flow tube 220 (shown in dashed lines) of the safety valve 112 (FIGS. 2A-2B) is depicted as extending through the flapper valve 302 and thereby holding the flapper 306 in the open position. More particularly, the combined spring force of the first and second torsion springs 314a,b is overcome by extending the flow tube 220 through the flapper valve 302 and engaging and pivoting the flapper 306 to the open position. In the open position, as discussed above, fluids may be able to pass through the flapper valve 302 and proceed up the tubing string 114 (FIG. 1) to a surface location.

In some embodiments, when the flapper valve 302 is in the open position, the axial length of the flapper valve 302 on the downhole end is longer than the axial length of the closure mechanism 312. More particularly, when the flapper valve 302 is in the open position, the second beam end 328b of the closure member 322 may not extend axially past an axial extent 402 of the flapper 306. Rather, an axial offset or difference 404 may be provided between the second beam end 328b of the closure member 322 and the axial extent 402 of the flapper 306. The axial difference 404 may prove advantageous in retrofitting existing flapper valves with the closure mechanism 312 since adding the closure mechanism 312 will not interfere with ordinary design configurations of conventional flapper valves.

For example, in FIG. 2B, the flapper 227 is shown moving between open and closed positions within a flapper chamber 240 that exhibits a chamber length L. The closure mechanism 312 may be axially shorter than the chamber length L. Consequently, the presently described designs do not require additional chamber length L in the housing 202 or related bottom sub. As long as the annular area between the body 304 and the flapper chamber 240 permits, the closure mechanism 312 described herein can be implemented to existing flapper valve designs without requiring modification to the existing housing 202 or related bottom sub to account for additional chamber length L.

When it is desired to close the flapper 306, the flow tube 220 may be retracted uphole (to the left in FIGS. 4A and 4B), as generally described above, thereby allowing the combined spring force of the first and second torsion springs 314a,b to pivot the flapper 306 to the closed position, as shown in FIG. 4B. More particularly, the spring force of the first torsion spring 314a may be transferred to the back surface of the flapper 306 via the spring arm 316 and thereby urges the flapper 306 toward the closed position. In addition to the spring force of the first torsion spring 314a, the spring force of the second torsion spring 314b may also be transferred to the back surface of the flapper 306 to help urge the flapper 306 toward the closed position.

More specifically, the first arm 326a of the second torsion spring 314b biases against the underside of the axial extension 320 while the second arm 326b engages and biases against the closure beam 322. The spring force exhibited by the second torsion spring 314b via the first and second arms 326a,b continuously urges the closure beam 322 to pivot about the pivot point 324 and into engagement with the backside of the flapper 306 within the groove 330. As the flapper 306 transitions between the open and closed positions, the second beam end 328b of the closure beam 322 may slidingly engage the backside of the flapper 306 within the groove 330. As will be appreciated, the groove 330 may provide a channel or guide that allows the closure beam 322 to slidingly engage the flapper 306 without slipping laterally out of engagement with the backside of the flapper 306.

Accordingly, the second torsion spring 314b acts on the closure beam 322 so that the closure beam 322 can serve as a fulcrum arm that provides supplemental closing force on the flapper 306 in addition to the closing force provided by the first torsion spring 314a. The combined spring forces of the first and second torsion springs 314a,b may help the flapper 306 engage and properly seal against the valve seat 310. Once properly seated against the valve seat 310, as shown in FIG. 4B, the flapper 306 may effectively prevent the migration of fluids past the flapper valve 302 and otherwise in the uphole direction (to the left in FIGS. 4A and 4B).

In some embodiments, as best seen in FIG. 4B, the length of the closure beam 322 as extending from the pivot point 324 may extend past a central axis 406 of the flapper valve 302 and, consequently, past a central location on the flapper 306 when the flapper 306 is in the closed position. As used herein, the phrase "central location" refers to the center of mass of the flapper 306, which may equally correspond to a central point between opposing sides or radial ends of the flapper 306. This may allow the closure beam 322 to provide continued mechanical advantage over the flapper 306 as the flapper 306 moves between the open and closed positions. More particularly, a closure beam 322 that extends past the central point provides more torque (with a same amount of force) to pick-up and shut the flapper 306 against the valve seat 310.

The combined closing force provided by the first and second torsion springs 314a,b may allow an operator to employ a thicker or more robust flapper 306 that is optimally designed without having much material removed from its outer surfaces. As such, the performance of the flapper 306 is not compromised through the addition of the closure mechanism 312. Moreover, as mentioned above, incorporating the closure mechanism 312 into conventional flapper valves will not require additional axial length in the flapper valve since, when the flapper valve is in the open position, the second beam end 328b of the closure member 322 does not extend axially past the axial extent 402 of the flapper 306.

Embodiments disclosed herein include:

A. A flapper valve that includes a body having a first end and a second end, a flapper pivotably coupled to the body at the second end and movable between a closed position, where the flapper prevents fluid flow through the body, and an open position, where fluid flow is allowed through the body, a first torsion spring coupled to the body at the second end and providing a spring arm that engages and urges the flapper to the closed position, a support beam coupled to the body and including an axial extension that extends axially past the second end, a closure beam having a first beam end pivotably coupled to the axial extension and a second beam end engageable with the flapper, and a second torsion spring coupled to the axial extension and engageable with the closure beam to urge the closure beam into engagement with the flapper.

B. A subsurface safety valve that includes an elongate housing, a flapper valve coupled to the elongate housing and including a body having a first end coupled to the elongate housing and a second end, a flapper pivotably coupled to the body at the second end, a first torsion spring coupled to the body at the second end and providing a spring arm engageable with the flapper, a support beam coupled to the body and including an axial extension that extends axially past the second end, a closure beam having a first beam end pivotably coupled to the axial extension and a second beam end engageable with the flapper, and a second torsion spring coupled to the axial extension and engageable with the closure beam to urge the closure beam into engagement with the flapper. The subsurface safety valve further including a flow tube axially movable within the elongate housing, wherein the flapper is movable between an open position, where the flow tube extends at least partially through the flapper valve and allows fluid flow through the elongate housing, and a closed position, where the flow tube is retracted axially and the flapper prevents fluid flow through elongate housing.

C. A method that includes axially moving a flow tube within an elongate housing of a subsurface safety valve and thereby moving the flow tube at least partially through a flapper valve coupled to the elongate housing, the flapper valve including a body having a first end coupled to the elongate housing and a second end, a flapper pivotably coupled to the body at the second end, a first torsion spring coupled to the body at the second end and providing a spring arm engageable with the flapper, a support beam coupled to the body and including an axial extension that extends axially past the second end, a closure beam having a first beam end pivotably coupled to the axial extension and a second beam end engageable with the flapper, and a second torsion spring coupled to the axial extension and engageable with the closure beam to urge the closure beam into engagement with the flapper. The method further including engaging the flapper with the flow tube and thereby moving the flapper to an open position where fluid flow through the flapper valve and the elongate housing is allowed, retracting the flow tube out of engagement with the flapper, and cooperatively urging the flapper to a closed position with the first and second torsion springs to prevent fluid flow through the flapper valve and the elongate housing.

Each of embodiments A, B, and C may have one or more of the following additional elements in any combination: Element 1: wherein the second torsion spring comprises a first arm engageable with an underside of the axial extension, and a second arm that biases against the closure beam. Element 2: further comprising a groove defined in a backside of the flapper, wherein the second beam end engages and slides within the groove as the flapper moves between the open and closed positions. Element 3: wherein, when the flapper is in the open position, an axial extent of the flapper extends past the second beam end. Element 4: wherein, when the flapper is in the closed position, the closure beam extends past a central location on the flapper. Element 5: wherein the closure beam and the second torsion spring are coupled to the axial extension at a pivot point located between the second end and a distal end of the axial extension.

Element 6: wherein the first and second torsion springs cooperatively urge the flapper to the closed position. Element 7: wherein the second torsion spring comprises a first arm engageable with an underside of the axial extension, and a second arm that biases against the closure beam. Element 8: further comprising a groove defined in a backside of the flapper, wherein the second beam end engages and slides within the groove as the flapper moves between the open and closed positions. Element 9: wherein, when the flapper is in the open position, an axial extent of the flapper extends past the second beam end. Element 10: wherein, when the flapper is in the closed position, the closure beam extends past a central location on the flapper.

Element 11: wherein the second torsion spring includes a first arm engageable with an underside of the axial extension and a second arm engageable with the closure beam, wherein cooperatively urging the flapper to a closed position comprises biasing the closure beam against a backside of the flapper with the second arm. Element 12: wherein a groove is defined in a backside of the flapper, the method further comprising slidingly engaging the backside of the flapper with the second beam within the groove as the flapper moves between the open and closed positions. Element 13: further comprising producing fluids to a surface location with the flapper in the open position. Element 14: wherein, when the flapper is in the open position, an axial extent of the flapper extends past the second beam end. Element 15: further comprising extending the closure beam extends past a central location on the flapper when the flapper is in the closed position and thereby obtaining mechanical advantage over the flapper.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

What is claimed is:

1. A flapper valve, comprising:
    a body having a first end and a second end;
    a flapper pivotably coupled to the body at the second end and movable between a closed position, where the flapper prevents fluid flow through the body, and an open position, where fluid flow is allowed through the body;
    a first torsion spring coupled to the body at the second end and providing a spring arm that engages and urges the flapper to the closed position;
    a support beam coupled to the body and including an axial extension that extends axially past the second end;
    a closure beam having a first beam end pivotably coupled to the axial extension and a second beam end engageable with the flapper; and
    a second torsion spring coupled to the axial extension and engageable with the closure beam to urge the closure beam into engagement with the flapper.

2. The flapper valve of claim 1, wherein the second torsion spring comprises:
    a first arm engageable with an underside of the axial extension; and
    a second arm that biases against the closure beam.

3. The flapper valve of claim 1, further comprising a groove defined in a backside of the flapper, wherein the second beam end engages and slides within the groove as the flapper moves between the open and closed positions.

4. The flapper valve of claim 1, wherein, when the flapper is in the open position, an axial extent of the flapper extends past the second beam end.

5. The flapper valve of claim 1, wherein, when the flapper is in the closed position, the closure beam extends past a central location on the flapper.

6. The flapper valve of claim 1, wherein the closure beam and the second torsion spring are coupled to the axial extension at a pivot point located between the second end and a distal end of the axial extension.

7. A subsurface safety valve, comprising:
    an elongate housing;
    a flapper valve coupled to the elongate housing and including:
        a body having a first end coupled to the elongate housing and a second end;
        a flapper pivotably coupled to the body at the second end;
        a first torsion spring coupled to the body at the second end and providing a spring arm engageable with the flapper;
        a support beam coupled to the body and including an axial extension that extends axially past the second end;
        a closure beam having a first beam end pivotably coupled to the axial extension and a second beam end engageable with the flapper; and
        a second torsion spring coupled to the axial extension and engageable with the closure beam to urge the closure beam into engagement with the flapper; and
    a flow tube axially movable within the elongate housing, wherein the flapper is movable between an open position, where the flow tube extends at least partially through the flapper valve and allows fluid flow through the elongate housing, and a closed position, where the flow tube is retracted axially and the flapper prevents fluid flow through elongate housing.

8. The subsurface safety valve of claim 7, wherein the first and second torsion springs cooperatively urge the flapper to the closed position.

9. The subsurface safety valve of claim 7, wherein the second torsion spring comprises:
    a first arm engageable with an underside of the axial extension; and
    a second arm that biases against the closure beam.

10. The subsurface safety valve of claim 7, further comprising a groove defined in a backside of the flapper, wherein the second beam end engages and slides within the groove as the flapper moves between the open and closed positions.

11. The subsurface safety valve of claim 7, wherein, when the flapper is in the open position, an axial extent of the flapper extends past the second beam end.

12. The subsurface safety valve of claim 7, wherein, when the flapper is in the closed position, the closure beam extends past a central location on the flapper.

13. A method, comprising:
    axially moving a flow tube within an elongate housing of a subsurface safety valve and thereby moving the flow tube at least partially through a flapper valve coupled to the elongate housing, the flapper valve including:
        a body having a first end coupled to the elongate housing and a second end;
        a flapper pivotably coupled to the body at the second end;
        a first torsion spring coupled to the body at the second end and providing a spring arm engageable with the flapper;
        a support beam coupled to the body and including an axial extension that extends axially past the second end;
        a closure beam having a first beam end pivotably coupled to the axial extension and a second beam end engageable with the flapper; and
        a second torsion spring coupled to the axial extension and engageable with the closure beam to urge the closure beam into engagement with the flapper; and
    engaging the flapper with the flow tube and thereby moving the flapper to an open position where fluid flow through the flapper valve and the elongate housing is allowed;
    retracting the flow tube out of engagement with the flapper; and
    cooperatively urging the flapper to a closed position with the first and second torsion springs to prevent fluid flow through the flapper valve and the elongate housing.

14. The method of claim 13, wherein the second torsion spring includes a first arm engageable with an underside of the axial extension and a second arm engageable with the closure beam, wherein cooperatively urging the flapper to a closed position comprises biasing the closure beam against a backside of the flapper with the second arm.

15. The method of claim 13, wherein a groove is defined in a backside of the flapper, the method further comprising slidingly engaging the backside of the flapper with the second beam end within the groove as the flapper moves between the open and closed positions.

16. The method of claim 13, further comprising producing fluids to a surface location with the flapper in the open position.

17. The method of claim 13, wherein, when the flapper is in the open position, an axial extent of the flapper extends past the second beam end.

18. The method of claim 13, further comprising extending the closure beam extends past a central location on the flapper when the flapper is in the closed position and thereby obtaining mechanical advantage over the flapper.

* * * * *